(12) United States Patent
Kim (10) Patent No.: US 7,286,344 B2
(45) Date of Patent: Oct. 23, 2007

(54) PORT REPLICATOR

(75) Inventor: Yun-Tae Kim, Pyeongtaek (KR)

(73) Assignee: LG Electronics Inc., Seoul (KR)

( * ) Notice: Subject to any disclaimer, the term of this patent is extended or adjusted under 35 U.S.C. 154(b) by 150 days.

(21) Appl. No.: 11/135,384

(22) Filed: May 24, 2005

(65) Prior Publication Data

US 2005/0286219 A1    Dec. 29, 2005

(30) Foreign Application Priority Data

Jun. 28, 2004   (KR) ...................... 10-2004-0049054

(51) Int. Cl.
*G01F 1/16* (2006.01)
(52) U.S. Cl. ...................... 361/686; 361/683; 361/801; 70/58; 248/552
(58) Field of Classification Search ................ 361/679, 361/683, 686, 680, 724–727; 70/57, 57.1, 70/58, 32–34; 710/303, 304; 395/186, 188.01, 395/43.12–43.22; 439/341, 372, 142; 248/552, 248/553
See application file for complete search history.

(56) References Cited

U.S. PATENT DOCUMENTS 6,522,533 B1 * 2/2003 Ikeuchi et al. .............. 361/686
6,768,652 B2 * 7/2004 DeLuga ...................... 361/801
7,110,252 B2 * 9/2006 Liang et al. ................ 361/686

FOREIGN PATENT DOCUMENTS

KR    10-2004-0031900 A    4/2004

* cited by examiner

*Primary Examiner*—Michael Datskovskiy
(74) *Attorney, Agent, or Firm*—Birch, Stewart, Kolasch & Birch, LLP (57) ABSTRACT

A port replicator includes upper and lower cases including a plurality of ports. An inclined supporting surface is formed with a connector for electrical connection with a computer at a front top surface of the cases. An actuating lever is provided at one side of the cases and receives an actuating force from a user. A link mechanism is provided within the cases. A driving plate is provided within the cases and includes at least one pair of cam slots and push cams and linearly moves in response to the actuating force transmitted via the link mechanism. A pair of catching hooks are guided along the cam slots and include a catching protrusion exposed from the top surface of the cases capable of catching a groove formed on a bottom surface of the computer. Push protrusions are guided by the push cams and selectively protrude beyond the top surface of the cases, thereby pushing up the bottom surface of the computer when the catching hooks are unfastened from the computer.

22 Claims, 9 Drawing Sheets

PORT REPLICATOR

This application claims the priority benefit of Patent application Ser. No. 10-2004-0049054 filed on Jun. 28, 2004 in Republic of Korea, which is hereby incorporated by reference.

BACKGROUND OF THE INVENTION

1. Field of the Invention

The present invention relates to a port replicator, and more particularly, to a port replicator which can be mounted to a portable computer, such that the portable computer and peripheral devices can be more easily connected with each other.

2. Description of the Prior Art

A port replicator is used to expand the function of a portable computer such as a notebook computer and includes a variety of connection ports. Such a port replicator allows only a portable computer to be separated and carried or used in a state where the portable computer is connected to the peripheral devices connected to the connection ports of the port replicator.

Figure 1:
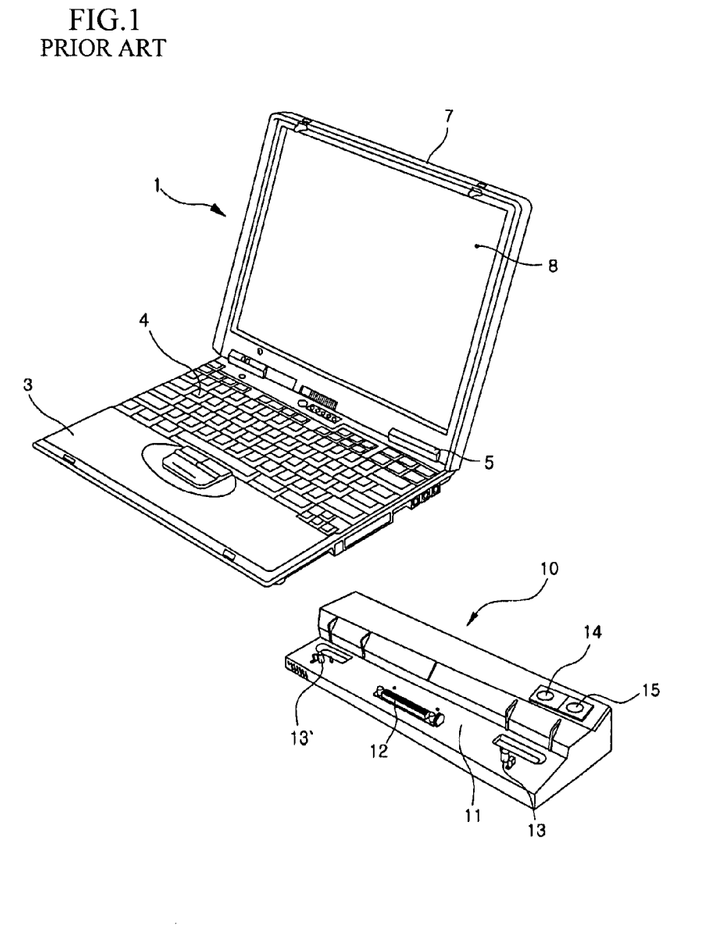
FIG. 1 is a perspective view showing the configuration of a portable computer and port replicator according to a related art.

FIG. 1 shows the configuration of a portable computer and port replicator, according to the related art. Referring to this figure, the portable computer 1 is mainly divided into a main body 3 and a display unit 7 that is mounted at an end of the main body 3, such that its angle relative to the main body 3 can be adjusted.

The main body 3 is shaped as a flat rectangular plate and includes a variety of parts and substrates installed therein. An input device such as a keyboard 4 is provided on a top surface of the main body 3. The display unit 7 is mounted to a rear end of the main body 3 by means of a hinge unit 5 in such a manner that its angle relative to the main body 3 can be adjusted. The display unit 7 is provided with a liquid crystal display 8 on which an image signal is displayed.

The port replicator 10 is generally configured to be mounted onto a rear bottom surface of the main body 3. A front top surface of the port replicator 10, i.e. a portion on which the rear bottom surface of the main body 3 is securely seated, includes an inclined supporting surface 11. A connector 12 for connection with the main body 3 is provided on the inclined supporting surface 11. The connector 12 is connected with a corresponding connector (not shown) formed on the rear bottom surface of the main body 3, such that electrical connection between the main body 3 and the port replicator 10 can be made.

Catching hooks 13 and 13' are provided on the inclined supporting surface 11. The catching hooks 13 and 13' serve to fasten the port replicator 10 to the main body 3. A separation button 14 is provided on a portion of a top surface of the port replicator 10. The separation button 14 causes the catching hooks 13 and 13' to be unfastened from the main body 3. Reference numeral 15 denotes a power button, and the portable computer 1 mounted to the port replicator 10 can be turned on/off by means of the power button 15.

Further, a variety of ports including LAN port(s), modem port(s), external monitor port(s), parallel port(s), serial port(s), keyboard port(s), mouse port(s), USB port(s) and card slot(s) into which PCMCIA card(s) can be inserted are provided on a rear surface of the port replicator 10.

However, the aforementioned related art has several drawbacks. To separate the portable computer 1 from the port replicator 10, the separation button 14 should be pressed. This is because the separation button is connected to the catching hooks 13 and 13' through a certain mechanism such that the catching hooks 13 and 13' are unfastened from the portable computer 1 only when the separation button 14 is moved. However, a range of movement within which the separation button 14 can be pressed and moved is limited or short. Therefore, there are problems in that the operation of the catching hooks 13 and 13' are not relatively smooth and a large force is required in separating a portable computer from the port replicator 10.

Further, in the related art, the catching hooks 13 and 13' are generally restored to their original positions by means of springs. Therefore, there is another problem in that the catching hooks 13 and 13' do not work well when the spring is weakened or its assembled state is poor.

SUMMARY OF THE INVENTION

Accordingly, the present invention is conceived to solve one or more of the aforementioned drawbacks in the related art. An object of the present invention is to provide a port replicator from which a portable computer can be smoothly separated.

Another object of the present invention is to provide a port replicator from which a portable computer can be separated by means of a single actuating lever.

According to an aspect of the present invention for achieving the objects, there is provided a port replicator comprising a case which defines an external appearance of the port replicator and includes a plurality of ports formed in at least a rear surface of the case. The case includes an inclined supporting surface formed with a connector for electrical connection with a computer. The inclined supporting surface is formed at a front top surface of the case. An actuating lever is provided at one side of the case to receive an actuating force from a user. A link mechanism is provided within the case to transmit the actuating force applied to the actuating lever. A driving plate is provided within the case and includes at least one pair of cam slots and push cams, and linearly moves by means of the actuating force transmitted through the link mechanism. A pair of catching hooks are guided along the cam slots and include catching protrusions exposed from the top surface of the case. The catching protrusions are selectively hooked in a catching groove formed on a bottom surface of the computer. At least a pair of push protrusions are guided by the push cams and include a protruding portion capable of being selectively protruding beyond the top surface of the case. The push protrusions push up the bottom surface of the computer in a state when the catching hooks are unfastened from the computer.

The case may be composed of upper and lower cases, and the push protrusions may be supported by the upper case, such that the upper case can be lifted or lowered relative to the lower case.

The driving plate may be formed with a slot penetrating through a portion thereof, and a restoring member for imparting a restoring force to the driving plate may be installed in the restoring member slot.

Preferably, a linear motion of the driving plate is guided by means of one or more guide ribs formed on an inner surface of the case.

Preferably, at least one hook is provided at and hooked in both longitudinal ends of the driving plate to prevent the driving plate from being inadvertently detached from the lower case, and some of the hooks can be elastically deformed to allow the driving plate to be installed on or detached from the lower case.

The pair of cam slots formed on the driving plate may be spaced apart from and in parallel with each other, and each of the cam slots may include a release portion, a catching portion and a release driving portion for connecting the release and catching portions.

Preferably, each of the catching hooks comprises a hook body installed to be movable in a direction perpendicular to a direction in which the driving plate is moved; a catching protrusion formed at one side of the hook body and protruding from the top surface of the upper case; and a cam follower formed at the other side of the hook body, remote from the catching protrusion and guided along the cam slot of the driving plate.

The hook body may be guided for movement along hook guides formed in a direction perpendicular to a plate guide for guiding a motion of the driving plate.

Preferably, each of the push cams may include a horizontal portion that is formed flat at a relatively higher position and an inclined portion that is formed to be inclined toward a relatively lower position.

Preferably, each of the push protrusions comprises a push protrusion body including a guide inclined portion formed at a bottom surface thereof and guided by the inclined portion of the push cam; a protruding portion formed on a top surface of the push protrusion body and protruding selectively from the top surface of the case; and catching holes which are formed at the push protrusion body adjacent to both ends of the protruding portion by vertically perforating through the push protrusion body and into which a hook formed on an inner surface of the case is hooked.

According to the present invention configured as above, the portable computer can be more easily separated from the port replicator as compared to the related art. In particular, since the portable computer can be handled with one hand while the actuating lever of the port replicator can also be handled with the other hand, there is an advantage in that the convenience of the port replicator is enhanced.

In addition, since the fastening and unfastening operations of the catching hooks are produced while the cam followers are guided along the cam slots, the cam followers do not run off tracks along the cam slots even due to any external forces. Therefore, there is another advantage in that the operating reliability of the port replicator is enhanced.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which:

FIG. 2b is a rear perspective view showing an external appearance of the port replicator of FIG. 2a;

DETAILED DESCRIPTION OF THE PREFERRED EMBODIMENTS

This application is related to a co-pending, commonly assigned application entitled "AN ANTITHEFT DEVICE FOR A PORT REPLICATOR," filed on even date herewith, the contents of which are herein incorporated by reference.

Hereinafter, a port replicator according to the present invention will be described in detail with reference to the accompanying drawings.

Figure 2A:
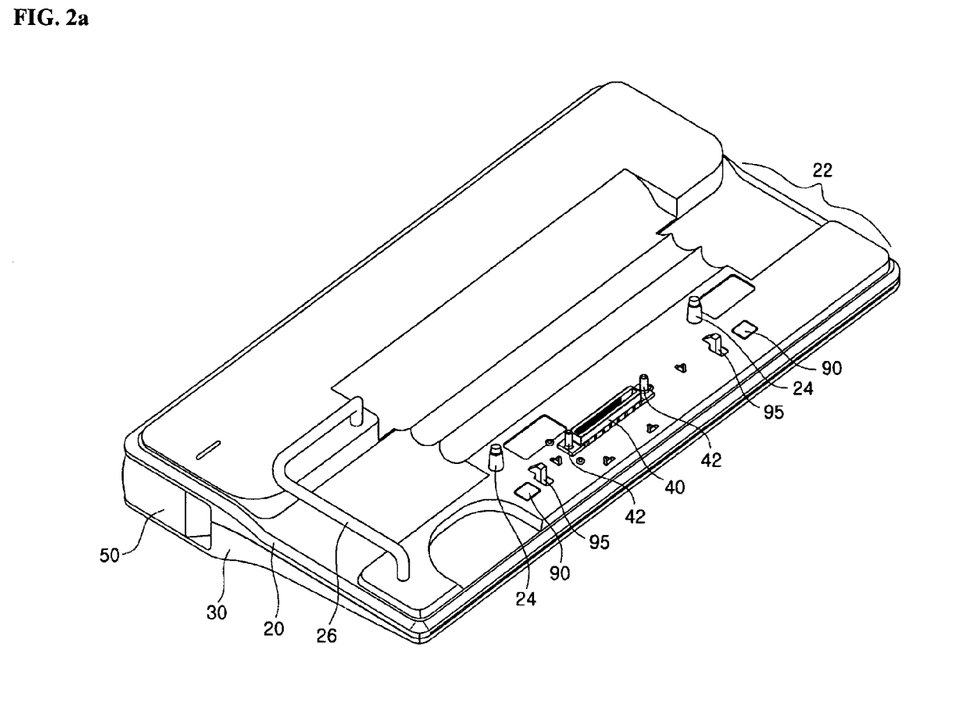
FIG. 2a is a front perspective view showing an external appearance of a port replicator, according to the present invention.
Figure 2B:
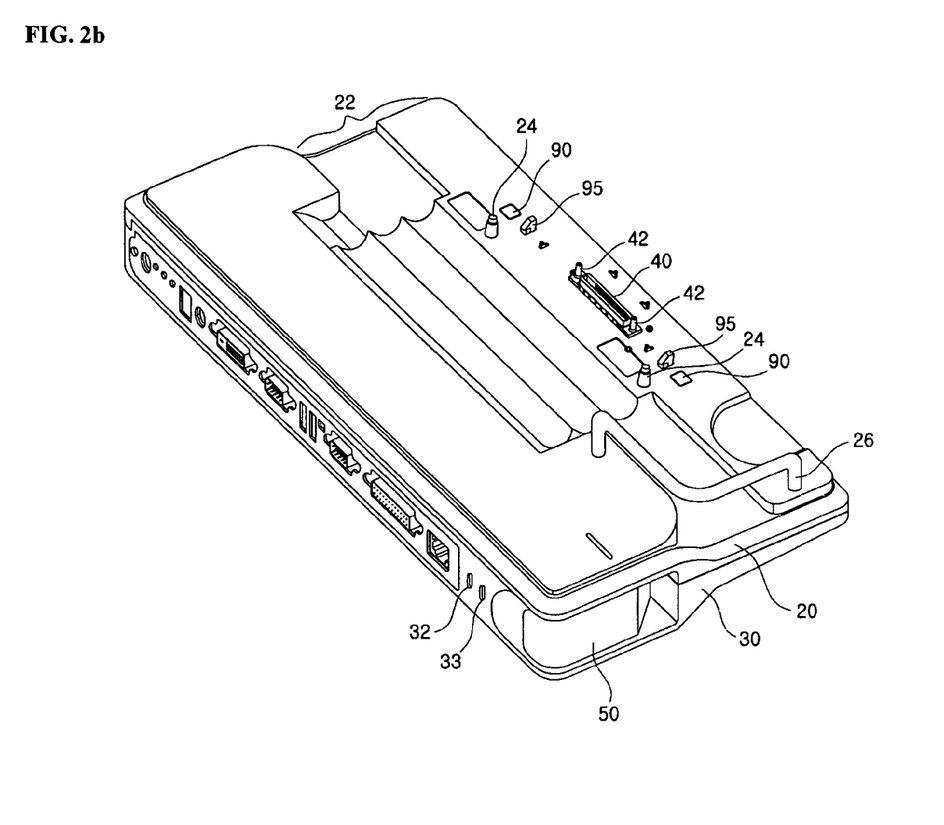
Figure 3:
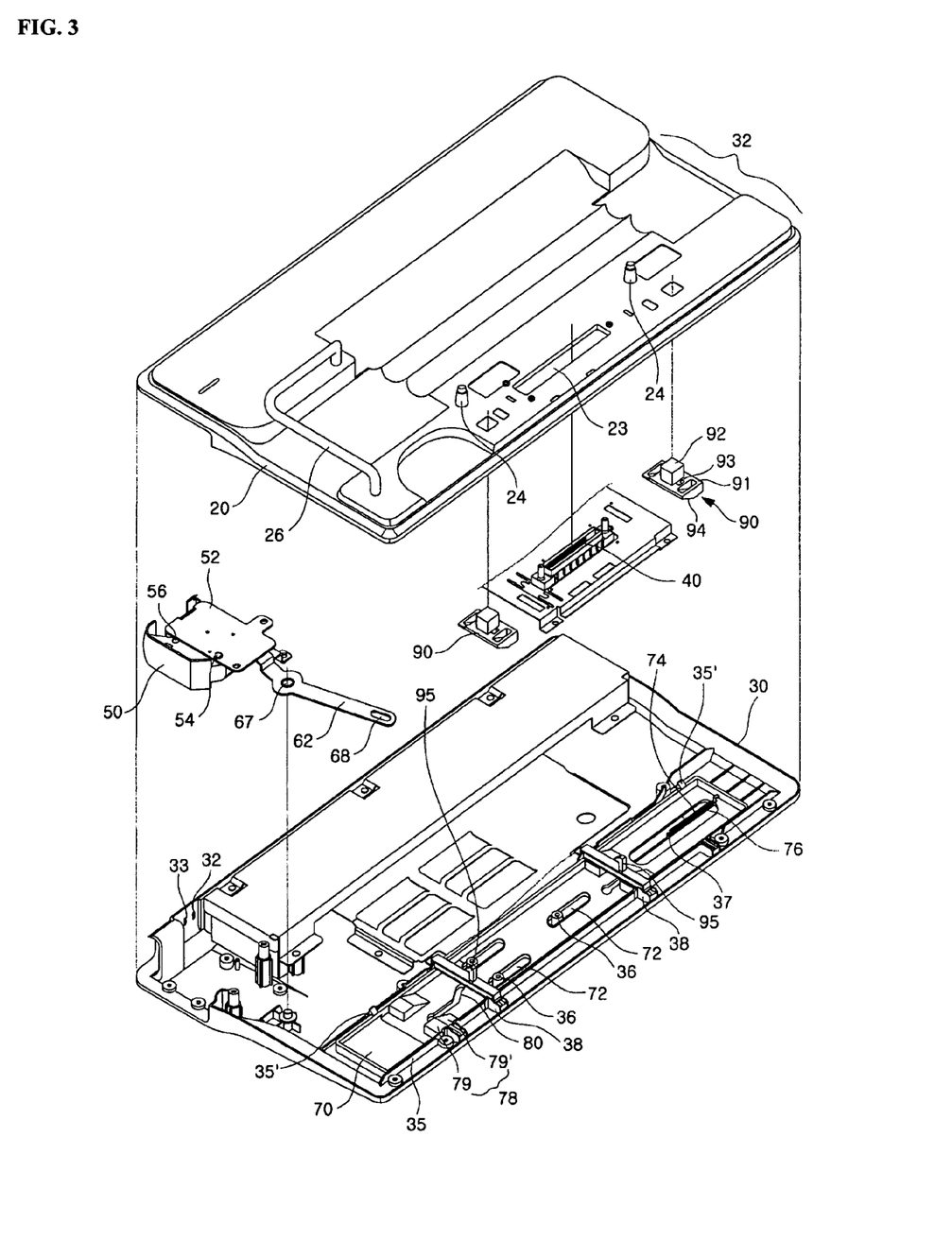
FIG. 3 is an exploded perspective view showing the configuration of the port replicator of FIG. 2.
Figure 4:
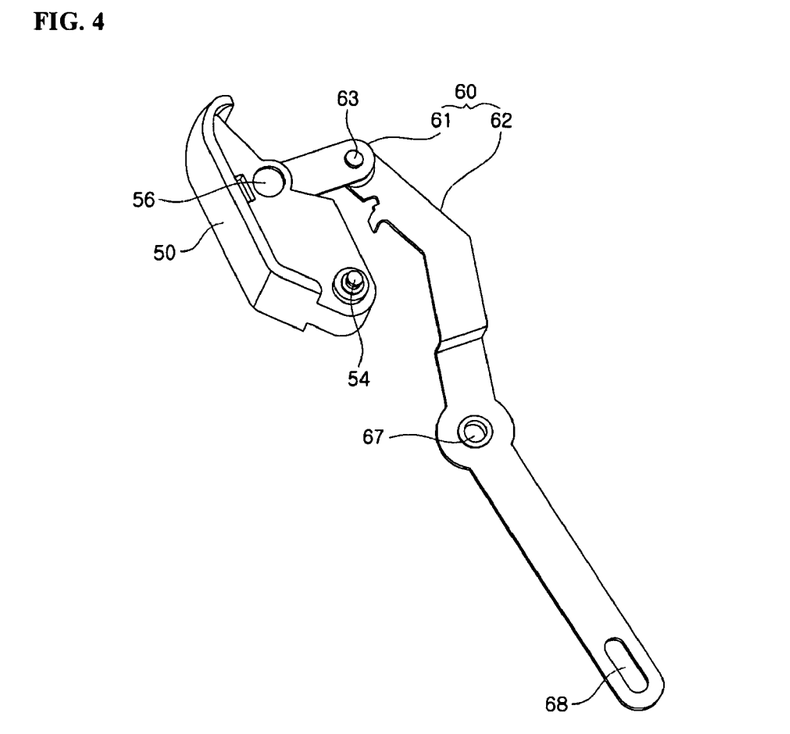
FIG. 4 is a perspective view showing the configuration of moveable portions of the port replicator, according to the present invention.
Figure 5A:
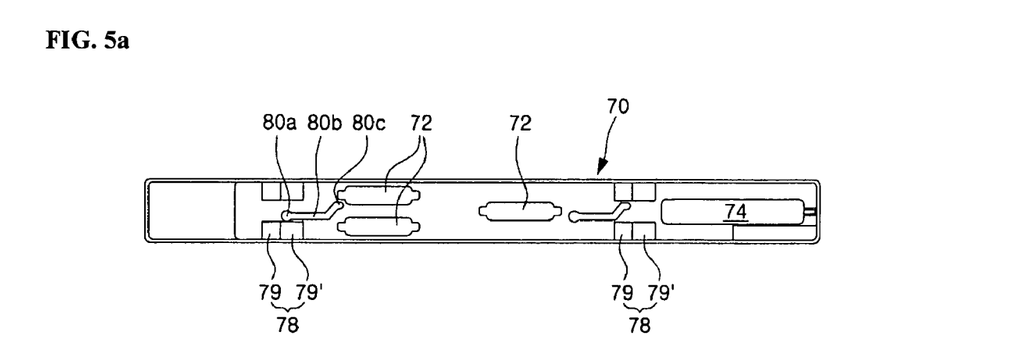
FIG. 5a is a plan view of a driving plate of the port replicator, according to the present invention.
Figure 5B:
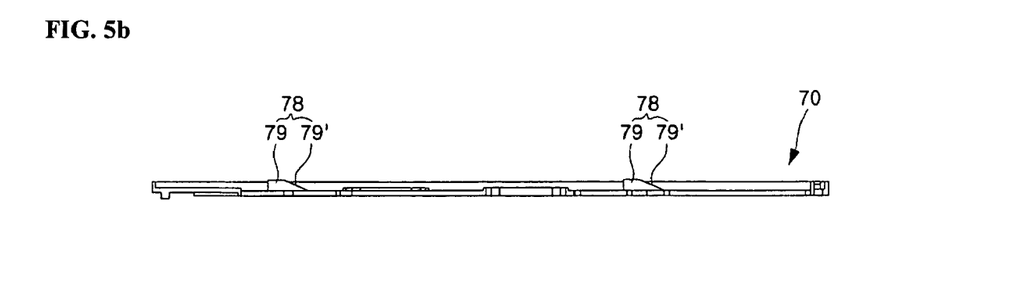
FIG. 5b is a front view of a driving plate of the port replicator, according to the present invention.
Figure 6:
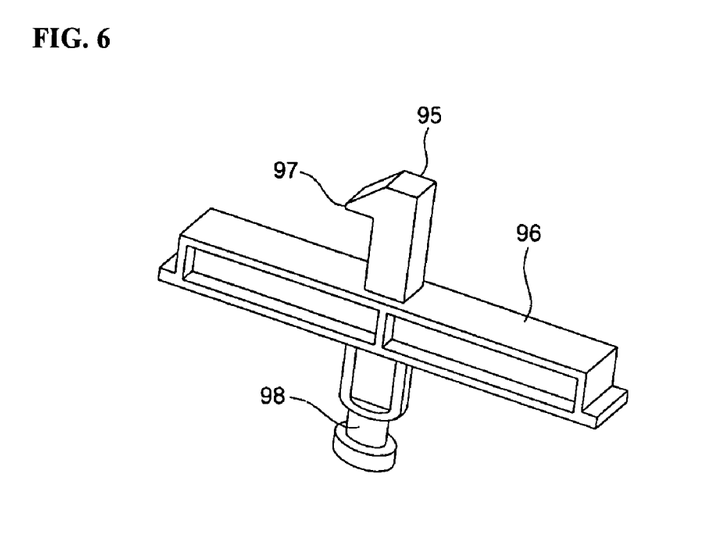
FIG. 6 is a perspective view showing the configuration of a catching hook of the port replicator, according to the present invention.

FIGS. 2a and 2b are perspective views showing an external appearance of the port replicator according to the present invention. FIG. 3 is an exploded perspective view showing the configuration of the port replicator, according to the present invention. FIG. 4 is a perspective view showing the configuration of moveable portions of an actuating lever and link mechanism, according to the present invention. FIGS. 5a and 5b show the configuration of a driving plate of the port replicator according to the present invention. FIG. 6 is a perspective view showing the configuration of catching hooks of the port replicator, according to the present invention.

Referring to these figures, the port replicator according to the present invention is divided into an upper case 20 and a lower case 30 that define an external appearance of the port replicator. The upper and lower cases 20 and 30 are generally shaped as flat plates and combined together, define a predetermined space therebetween. An inclined supporting surface 22 is formed on a top surface of the upper case 20 over a predetermined width from a front end thereof. A rear bottom surface of a portable computer is securely seated on the inclined supporting surface 22. Thus, the portable computer is attached to the port replicator in such a manner that its front end is relatively lower than its rear end.

A rectangular connector hole 23 is perforated through the top surface of the upper case 20 within the inclined supporting surface 22. A connector 40, to be explained later, is exposed through the top of the upper case 20 through the connector hole 23. Two guide bosses 24 are formed at both lateral sides to be spaced apart from the connector hole 23 by a predetermined distance. The guide bosses 24 are integrally formed on the top surface of the upper case 20. A guide rod 26 is provided on a portion of the upper case 20. The guide rod 26 is generally 'L' shaped and located at an edge corresponding to a corner of the inclined supporting surface 22. The guide rod 26 serves to cover a portion in the vicinity of the corner where the side and rear surfaces of the portable computer mounted onto the port replicator, intersect with each other.

The lower case 30 defines an external appearance of the bottom and rear surfaces of the port replicator. As shown in FIG. 2b, a plurality of ports or jacks are exposed from the rear surface of the lower case 30. For the simplicity of explanation, detailed descriptions on the ports or jacks are omitted herein. First and second locking holes 32 and 33 are provided on a side of the rear surface of the lower case 30. The first and second locking holes 32 and 33 accept a lock, such as lock sold under the trademark Kensington lock, which permits the port replicator to be fixed to other fixed structures (such as a desk). The other structures installed within the lower case 30 will be described together when explaining parts which will be installed on the relevant structures.

A circuit board (not shown) on which the ports and jacks are installed is provided within the lower case 30. At one side of the circuit board is provided the connector 40 which is exposed to the outside through the connector hole 23 of the upper case 20. The connector 40 serves to electrically connect the port replicator and the portable computer.

Guide bosses 42 are integrally formed on both ends of a housing of the connector 40. The guide bosses 42 serve to allow the portable computer to be easily mounted to the port replicator, in the same manner as the guide bosses 24 formed on the upper case 20.

An actuating lever 50 is provided on a side of the external surface of the port replicator, formed by combining the upper and lower cases 20 and 30. The actuating lever 50 is operated with the hand of a user to separate the portable computer from the port replicator. The actuating lever 50 is installed on a lever base 52 provided within the combined upper and lower cases 20 and 30.

The lever base 52 is made of a metal material and formed in such a manner that the actuating lever 50 is rotated about a lever hinge 54 by a predetermined angle at a side thereof as shown in FIG. 4. The actuating lever 50 is pivotably connected to a first link 61 of a link mechanism 60 to be explained later by means of a lever connection pin 56.

The actuating force of the actuating lever 50 is transmitted to a driving plate 70 to be explained later by means of the link mechanism 60. The link mechanism 60 is composed of the first link 61 and a second link 62. The first link 61 is connected to the actuating lever 50 by means of the lever connection pin 56. The second link 62 is configured such that an end thereof is connected to the first link 61 by means of a link connection pin 63 and the other end thereof is connected to the driving plate 70. The second link 62 is also installed such that its middle portion can be rotated about a link hinge 67 with respect to the lower case 30.

A link hole 68, into which a connection pin (not shown) of the driving plate 70 is fitted, is perforated through a portion of the second link 62 where the second link 62 is connected to the driving plate 70. The link hole 68 allows the driving plate 70 to move linearly by means of the rotational motion of the second link 62.

The driving plate 70 is installed on a top surface of the lower case 30. To guide a motion of the driving plate 70 on the lower case 30, plate guides 35 are formed on the lower case 30 as clearly shown in FIG. 3. The plate guides 35 are formed to protrude from the top surface of the lower case 30 such that they can guide the driving plate 70 along a longitudinal direction thereof. Each of the plate guides 35 is formed to have a longitudinal length greater than the total length of the driving plate 70 for guiding smoothly both ends of the driving plate. It is not necessary that the plate guide 35 should be continuously formed.

Hooks 35' are provided in the vicinity of the plate guides 35 such that the driving plate 70 is not inadvertently detached from the lower case 30. At least four hooks 35' are provided in such a manner that the driving plate 70 can be fastened in a movable manner or condition. It is preferred that at least two of the hooks 35' be elastically formed to facilitate insertion and/or removal of the driving plate 70 between the plate guides 35.

At least two guide slots 72 are formed in the driving plate 70. In this embodiment, three guide slots 72 are formed. A guide boss 36, formed on the lower case 30, is positioned in each of the guide slots 72 so as to guide movement of the driving plate 70.

A slot 74 is formed at one end of the driving plate 70 to accommodate a restoring member. The slot 74 is formed to perforate through the driving plate 70. The restoring member 76, such as a coil spring, is installed in the slot 74. An end of the restoring member 76 is connected to a portion of the driving plate 70 within the slot 74. The other end of the restoring member 76 is fastened to a catch or hook portion 37, which is formed on the lower case 30. Therefore, the driving plate 70 tends to always move in one direction by means of the restoring member 76.

Push cams 78 are formed on the driving plate 70. The push cams 78 are formed at both ends of the driving plate with respect to an intermediate portion on which the guide slots 72 are formed. The push cams 78 formed at the both ends of the driving plate 70 are provided in pairs. Each of the push cams 78 is composed of a horizontal portion 79 and an inclined portion 79'. The horizontal portion protrudes higher than the inclined portion 79'. The inclined portion 79' is configured in such a manner that one end thereof is connected to the higher horizontal portion 79 and the other end thereof extends to a relatively lower position. The horizontal and inclined portions 79 and 79' of the push cam 78 are provided in parallel in a direction in which the driving plate 70 is moved.

Cam slots 80 are formed in the driving plate 70. The cam slots 80 are portions for driving catching hooks 95 to be explained later. As clearly shown in FIG. 3, the cam slots 80 are provided at both ends of the driving plate 70. Each of the cam slots 80 is composed of a release portion 80a, a release driving portion 80b and a catching portion 80c from a left side on the figure.

The release portion 80a is formed linearly in a longitudinal direction of the driving plate 70 (i.e., in a left and right direction as viewed in FIG. 5a). When the catching hook 95 is guided within the release portion 80a, it is in a state where the catching hook 95 is unfastened from the portable computer. The release driving portion 80b is formed to be inclined with respect to the release portion 80a. The catching portion 80c is provided at a distal end of the release driving portion 80b and extends by a predetermined length in an extending direction of the release portion 80a. When the catching hook 95 is guided within the catching portion 80c, it is in a state where the catching hook 95 is fastened into the portable computer.

Push protrusions 90 are installed in such a manner that their respective protruding portions 92 can selectively protrudes toward and through the inclined supporting surface 22 of the upper case 20. Each of the protruding portions 92 protrudes upwardly from a main body 91 of the push protrusion 90. The protruding portion 92 protrudes beyond the top surface of the upper case 20 to push up the bottom surface of the portable computer.

Catching holes 93 are formed at both ends of the protruding portion 92 to be vertically perforated through the main body 91 of the push protrusion. Each of the catching holes 93 is a portion into which a hook (not shown) extending downwardly from the bottom surface of the upper case 20 is hooked. For reference, a guide rib (not shown) formed on the bottom surface of the upper case 20 surrounds a peripheral portion of the main body 91 to guide the vertical motion of the push protrusion 90.

A guide inclined portion 94 is formed on a bottom surface of the main body 91. The guide inclined portion 94 serves to smoothly cooperate with the push cams 78 of the driving plate 70. The guide inclined portion 94 is formed on a part of the bottom surface of the main body 91.

Now, the configuration of the catching hook 95 is described with reference to FIG. 6. The catching hook 95 includes a main body 96. The main body 96 of the hook 95 (hereinafter, referred to as a "hook body") is generally shaped as a rectangular parallelepiped. The movement of the hook body 96 is guided by means of a hook guide 38 that is connected perpendicular to the plate guide 35 formed on the top surface of the lower case 30. Therefore, the hook body 96 is moved in a direction perpendicular to the direction in which the driving plate 70 is moved. The hook guide 38 is formed outside of the plate guide 35 such that it does not interfere with the driving plate 70.

A catching protrusion 97 is formed on a top surface of the hook body 96. The catching protrusion 97 protrudes beyond the top surface of the upper case 20 to be substantially fastened to the portable computer. The catching protrusion 97 is inclined from a top end thereof and extends toward a rear end of the upper case 20.

A cam follower 98 is provided at a lower portion of the hook body 96. The cam follower 98 extends in a direction opposite to a protruding direction of the catching protrusion 97. The cam follower 98 is securely seated in the cam slot 80 of the driving plate 70 and causes the catching hook 95 to be driven by means of the movement of the driving plate 70.

Hereinafter, the operation of the port replicator according to the present invention so configured will be described in detail.

Figure 7A:
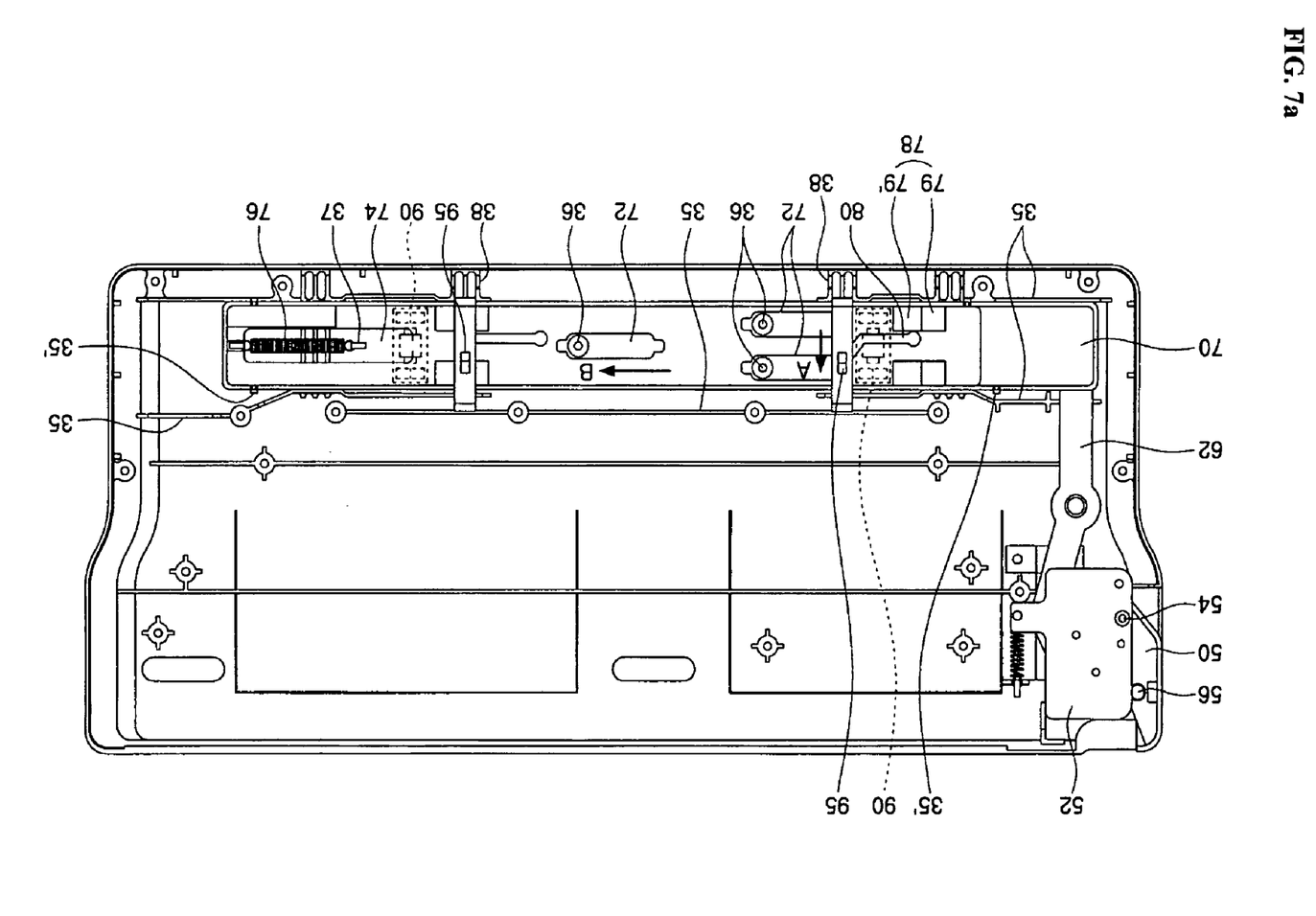
FIGS. 7a-7b are views illustrating the operating state of the port replicator, according to the present invention.
Figure 7B:
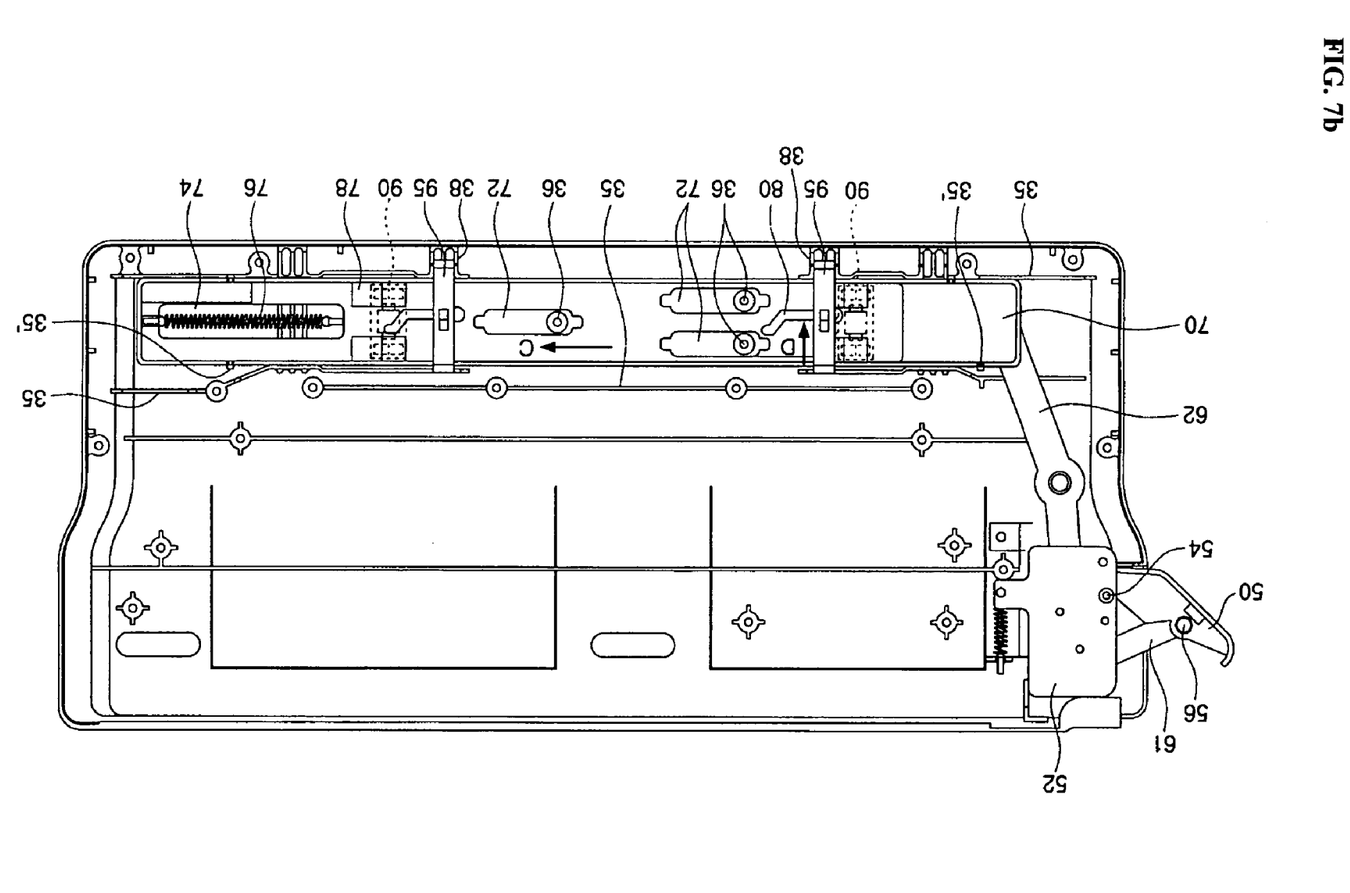

FIG. 7a shows a state where the actuating lever is not operated, i.e. where the portable computer is mounted to the port replicator, and FIG. 7b shows a state where the actuating lever is operated to release the portable computer.

Referring to FIG. 7a, the driving plate 70 is shifted to a leftmost position by means of the restoring force of the restoring member 76 as viewed in FIG. 7a. The actuating lever 50 is in a state where it does not protrude to the outside of the port replicator.

At this time, the guide boss 36 is located at the rightmost position of the guide slot 72, and the cam followers 98 are positioned at the catching portions 80c of the cam slots 80. Therefore, the catching protrusions 97 of the catching hooks 95 are in a state where they have been shifted relatively in a direction of an arrow A, as shown in FIG. 7a.

Further, a bottom surface of the push protrusion 90 is located at a position away from the push cam 78. That is, the protruding portion 92 of the push protrusion 90 is in a state where it does not protrude beyond the upper case 20.

Figure 8A:
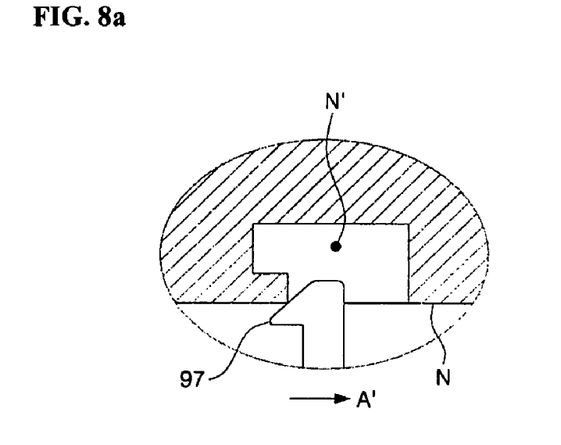
FIGS. 8a-8c are views illustrating how the catching hook of the port replicator is fastened to or unfastened from a portable computer, according to the present invention.

In such a state, when the user causes the rear bottom surface of the portable computer to be seated onto the inclined supporting surface 22 and presses down on the portable computer, the connector 40 is connected to the connector provided on the bottom surface of the portable computer. As shown in FIG. 8a, the top end of the catching protrusion 97 of the catching hook 95 is now pressed down by a mouth portion of a catching groove N' of the portable computer N and the hook body 96 of the catching hook 95 is also moved in a direction opposite to the direction of an arrow A, shown in FIG. 7a, i.e. a direction of an arrow A' shown in FIG. 8a. At this time, the movement of the hook body 96 is guided by means of the hook guide 38.

Further, as the catching hook 95 is guided along the hook guide 38, the cam follower 98 of the catching hook 95 is also guided along the release driving portion 80b of the cam slot 80 in the driving plate 70. Accordingly, as the cam follower 98 is moved along the release driving portion 80b, the driving plate 70 is moved in a direction of an arrow B in FIG. 7a.

Figure 8B:
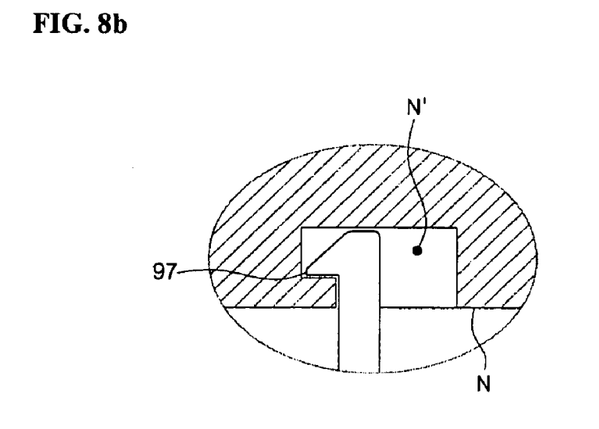

During this operation, when the portable computer is fully seated onto the inclined supporting surface 22 of the upper case 20, the catching protrusion 97 of the catching hook 95 is completely hooked into the catching groove N' of the portable computer N, as shown in FIG. 8b. That is, it is in a state where the catching protrusion 97 of the catching hook 95 is no longer pressed by the portable computer and fully hooked into the catching groove N' of the portable computer N. Thus, the catching hook 95 and the driving plate 70 are returned to a state shown in FIG. 7a. Such a return is accomplished by means of the restoring force of the restoring member 76.

If the catching protrusion 97 of the catching hook 95 is hooked in the catching groove N' of the portable computer N in such a manner, the cam follower 98 is positioned at the catching portion 80c of the cam slot 80. Thus, since the cam follower 98 is hooked in the catching portion 80c, the catching hook 95 cannot be moved in a longitudinal direction of the hook body 96, i.e. a direction perpendicular to the direction in which the driving plate 70 is moved, even though the user pulls up on the portable computer.

On the other hand, the user can merely operate the actuating lever 50 in order to separate the portable computer from the port replicator. If the actuating lever 50 is pulled around the lever hinge 54 toward the outside of the port replicator, the link mechanism 60 connected to the actuating lever 50 through the lever connection pin 56 pushes the driving plate 70 in a direction of an arrow C shown in FIG. 7b. At this time, the driving plate 70 is moved in a state where the both lateral sides thereof are guided along the plate guides 35.

As the driving plate 70 is moved, the catching hook 95 and the push protrusion 90 are sequentially operated. In other words, as the driving plate 70 is moved, the cam follower 98 is guided along the cam slot 80. Since the hook body 96 is simultaneously guided along the hook guide 38, when the cam follower 98 is guided along the cam slot 80, the catching hook 95 is moved by a distance corresponding to an interval between the catching portion 80c and release portion 80a of the cam slot 80.

Figure 8C:
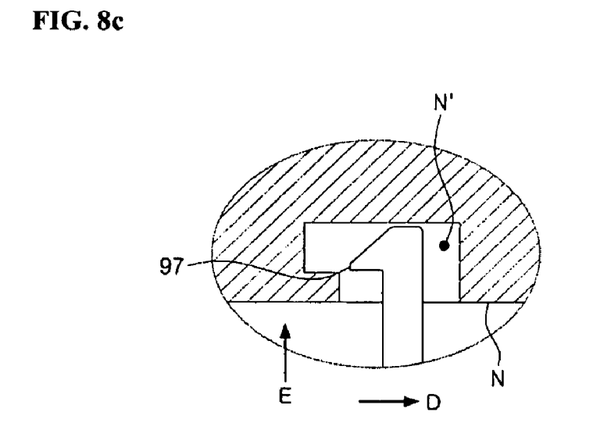

This results in, the catching hook 95 being moved in a direction of an arrow D shown in FIGS. 7b and 8c. Due to such a movement of the catching hook 95, the catching protrusion 97 is unfastened from the catching groove N' of the portable computer N.

Next, as the driving plate 70 is further continuously moved in such a manner, the protruding portion 92 of the push protrusion 90 protrudes upwardly from the upper case 20. That is, as the guide inclined portion 94 of the main body 91 of the push protrusion 90 is guided along the push cam 78 of the driving plate 70, the push protrusion 90 is raised.

As the guide inclined portion 94 of the push protrusion 90 is guided along the inclined portion 79' of the push cam 78, the protruding portion 92 of the push protrusion 90 starts to protrude upwardly from the upper case 20. Then, when a flat portion of the bottom surface of the main body 91 is securely seated onto the horizontal portion 79 of the push cam 78, the protruding portion 92 of the push protrusion 90 fully protrudes upwardly from the upper case 20 and pushes up the bottom surface of the portable computer N in a direction of an arrow E shown in FIG. 8c. At this time, since the catching protrusion 97 is not hooked in the catching groove N', the portable computer N is pushed upward.

The port replicator of the present invention as described above in detail has several advantages. The present invention is configured in such a manner that the actuating force of the actuating lever is transmitted to the driving plate using a leverage principle of a link mechanism. Therefore, since a force applied to the actuating lever is amplified and then transmitted to the driving plate, the operation of the catching hook driven by the driving plate can be more easily accomplished. Accordingly, the portable computer can be more easily separated from the port replicator.

Further, two sets of catching hooks and push protrusions are driven by means of a single actuating lever. Therefore, since the user can perform the separating operation by handling the actuating lever with one hand and the portable computer with the other hand, a user's convenience can be further improved.

Furthermore, since the cam follower is driven while being guided along the cam slot provided on the driving plate, the operation of the catching hook can be more precisely performed. That is, since the fastening and unfastening operations of the catching hook are produced while the hook is guided along the cam slot, the cam follower is less likely to run off a track along the cam slot due to any external forces. Therefore, the operating reliability of the port replicator is enhanced.

According to the present invention, the restoring member for causing the driving plate, the actuating lever and the like to be restored to their original positions is installed in the restoring member slot formed in the driving plate. Therefore, a space needed for installing the driving plate inside the port replicator can be minimized, and an internal space of the port replicator can be thus more efficiently utilized.

The scope of the present invention is not limited by the illustrated embodiment but defined by the appended claims. It will be apparent that those skilled in the art can make various modifications and changes within the scope of the invention defined by the claims.

What is claimed is:

1. A port replicator, comprising:
   a case for defining an external appearance of the port replicator, said case including a supporting surface and a plurality of ports, said supporting surface being formed with a connector for electrical connection with a computer;
   an actuating lever provided at an exterior of said case for receiving an actuating force from a user when the user intends to separate a computer from said port replicator;
   a driving plate provided within said case and including at least one cam slot and at least one push cam, said driving plate being moveable;
   a link mechanism provided within said case for transmitting the actuating force from said actuating lever to said drive plate to cause said drive plate to move;
   at least one first catching member guided along said at least one cam slot and being exposed from said supporting surface of said case, wherein said at least one catching member is adapted to be engaged to a second catching member formed on a bottom surface of the computer; and
   at least one push protrusion moved by said at least one push cam, said at least one push protrusion including a protruding portion capable of protruding beyond said supporting surface of said case to push against a bottom surface of the computer when said at least one first catching member is unfastened from the second catching member of the computer,
   wherein the at least one cam slot comprises a shape such that the at least one first catching member moves in a direction substantially perpendicular to a direction in which the driving plate is moved so the at least one first catching member engages with the second catching member formed on the bottom surface of the computer.

2. The port replicator according to claim 1, wherein said at least one push protrusion is coupled to said supporting surface of said case, and is retracted into said supporting surface of said case by gravity's force.

3. The port replicator according to claim 1, wherein said at least one push protrusion includes a pair of push protrusions.

4. The port replicator according to claim 1, wherein said case is composed of an upper case and a lower case, and said at least one push protrusion is supported by said upper case.

5. The port replicator according to claim 1, wherein said driving plate is formed with a restoring member slot penetrating through a portion thereof, and further comprising:
   a restoring member installed in said restoring member slot and imparting a restoring force tending to move said driving plate.

6. The port replicator according to claim 5, wherein said driving plate is linearly moveable and further comprising:
   a guide rib formed on an inner surface of said case to guide linear movement of said driving plate.

7. A port replicator, comprising:
   a case for defining an external appearance of the port replicator, said case including a supporting surface and a plurality of ports, said supporting surface being formed with a connector for electrical connection with a computer;
   an actuating lever provided at an exterior of said case for receiving an actuating force from a user when the user intends to separate a computer from said port replicator;
   a driving plate provided within said case and including at least one cam slot and at least one push cam, said driving plate being moveable;
   a link mechanism provided within said case for transmitting the actuating force from said actuating lever to said drive plate to cause said drive plate to move;
   at least one first catching member guided along said at least one cam slot and being exposed from said supporting surface of said case, wherein said at least one catching member is adapted to be engaged to a second catching member formed on a bottom surface of the computer; and
   at least one push protrusion moved by said at least one push cam, said at least one push protrusion including a protruding portion capable of protruding beyond said supporting surface of said case to push against a bottom surface of the computer when said at least one first catching member is unfastened from the second catching member of the computer,
   wherein said driving plate is linearly moveable and is formed with a restoring member slot penetrating through a portion thereof, and
   wherein said port replicator further comprises:
   a restoring member installed in said restoring member slot and imparting a restoring force tending to move said driving plate;

a guide rib formed on an inner surface of said case to guide linear movement of said driving plate; and at least one hook provided inside said case and hooked over a side of said driving plate to prevent said driving plate from becoming inadvertently detached from said case, wherein said at least one hook is elastically deformable, so that said driving plate can be inserted or remove relative to said case when said at least one hook is elastically deformed.

8. The port replicator according to claim 1, wherein said at least one cam slot includes a pair of cam slots formed on said driving plate, wherein said pair of cam slots are spaced apart from each other and are in parallel with each other, and wherein each of said cam slots includes a release portion, a catching portion and a release driving portion, with said release driving portion connecting said release portion to said catching portion.

9. The port replicator according to claim 1, wherein said at least one first catching member includes:

a hook body installed to be movable in a direction perpendicular to a direction in which said driving plate moves;

a catching protrusion formed at a top of said hook body and protruding from said supporting surface of said case; and a cam follower formed at a bottom of said hook body and guided along said at least one cam slot of said driving plate.

10. The port replicator according to claim 9, further comprising:

hook guides formed inside said case, wherein said hook body is guided for movement by said hook guides.

11. The port replicator according to claim 10, wherein said hook body moves in a direction perpendicular to a movement direction of said driving plate.

12. The port replicator according to claim 1, wherein said at least one push cam includes a horizontal portion that is formed flat at a relatively highest position of said at least one push cam, and includes an inclined portion that is formed to be inclined from said horizontal portion toward a relatively lower position along said driving plate.

13. A port replicator, comprising:

a case for defining an external appearance of the port replicator, said case including a supporting surface and a plurality of ports, said supporting surface being formed with a connector for electrical connection with a computer;

an actuating lever provided at an exterior of said case for receiving an actuating force from a user when the user intends to separate a computer from said port replicator;

a driving plate provided within said case and including at least one cam slot and at least one push cam, said driving plate being moveable;

a link mechanism provided within said case for transmitting the actuating force from said actuating lever to said drive plate to cause said drive plate to move;

at least one first catching member guided along said at least one cam slot and being exposed from said supporting surface of said case, wherein said at least one catching member is adapted to be engaged to a second catching member formed on a bottom surface of the computer; and at least one push protrusion moved by said at least one push cam, said at least one push protrusion including a protruding portion capable of protruding beyond said supporting surface of said case to push against a bottom surface of the computer when said at least one first catching member is unfastened from the second catching member of the computer, wherein said at least one push cam includes a horizontal portion that is formed flat at a relatively highest position of said at least one push cam, and includes an inclined portion that is formed to be inclined from said horizontal portion toward a relatively lower position along said driving plate, and wherein said at least one push protrusion includes:

a push protrusion body including a guide inclined portion formed at a bottom surface thereof for engaging said inclined portion of said at least one push cam;

a protruding portion formed on a top surface of said push protrusion body and protruding selectively from said supporting surface of said case; and catching holes formed in said push protrusion body adjacent to ends of said protruding portion, said catching holes engaging with hooks formed on an inner surface of said case to moveable attach said at least one push protrusion to said case.

14. A port replicator, comprising:

a case for defining an external appearance of the port replicator, said case including a supporting surface and a plurality of ports, said supporting surface being formed with a connector for electrical connection with a computer;

an actuating lever provided at an exterior of said case for receiving an actuating force from a user when the user intends to separate a computer from said port replicator;

a driving plate provided within said case and including at least one push cam, said driving plate being moveable;

a link mechanism provided within said case for transmitting the actuating force from said actuating lever to said drive plate to cause said drive plate to move; and at least one push protrusion moved by said at least one push cam, said at least one push protrusion including a protruding portion capable of protruding beyond said supporting surface of said case to push against a bottom surface of the computers, wherein said at least one push cam includes a horizontal portion that is formed flat at a relatively highest position of said at least one push cam, and includes an inclined portion that is formed to be inclined from said horizontal portion toward a relatively lower position along said driving plate, and wherein said at least one push protrusion includes:

a push protrusion body including a guide inclined portion formed at a bottom surface thereof for engaging said inclined portion of said at least one push cam;

a protruding portion formed on a top surface of said push protrusion body and protruding selectively from said supporting surface of said case; and catching holes formed in said push protrusion body adjacent to ends of said protruding portion, said catching holes engaging with hooks formed on an inner surface of said case to moveable attach said at least one push protrusion to said case.

15. The port replicator according to claim 14, wherein said at least one push protrusion is coupled to said supporting surface of said case, and is retracted into said supporting surface of said case by gravity's force.

16. The port replicator according to claim 14, wherein said driving plate is formed with a restoring member slot penetrating through a portion thereof, and further comprising:

a restoring member installed in said restoring member slot and imparting a restoring force tending to move said driving plate.

17. A port replicator, comprising:

a case for defining an external appearance of the port replicator, said case including a supporting surface and a plurality of ports, said supporting surface being formed with a connector for electrical connection with a computer;

an actuating lever provided at an exterior of said case for receiving an actuating force from a user when the user intends to separate a computer from said port replicator;

a driving plate provided within said case and including at least one cam slot, said driving plate being moveable;

a link mechanism provided within said case for transmitting the actuating force from said actuating lever to said drive plate to cause said drive plate to move; and at least one first catching member guided along said at least one cam slot and being exposed from said supporting surface of said case, wherein said at least one catching member is adapted to be engaged to a second catching member formed on a bottom surface of the computer, and wherein the at least one cam slot comprises a shape such that the at least one first catching member moves in a direction substantially perpendicular to a direction in which the driving plate is moved so the at least one first catching member engages with the second catching member formed on the bottom surface of the computer.

18. The port replicator according to claim 17, wherein said at least one first catching member includes:

a hook body installed to be movable in a direction perpendicular to a direction in which said driving plate moves;

a catching protrusion formed at a top of said hook body and protruding from said supporting surface of said case; and a cam follower formed at a bottom of said hook body and guided along said at least one cam slot of said driving plate.

19. The port replicator according to claim 18, further comprising:

hook guides formed inside said case, wherein said hook body is guided for movement by said hook guides, and wherein said hook body moves in a direction perpendicular to a movement direction of said driving plate.

20. The port replicator according to claim 1, wherein the at least one cam slot comprises:

a release portion formed linearly in a longitudinal direction of the driving plate;

a release driving portion formed to be inclined with respect to the release portion; and a catching portion provided at a distal end of the release driving portion and extending by a predetermined length in an extending direction of the release portion.

21. The port replicator according to claim 14, wherein the at least one cam slot comprises:

a release portion formed linearly in a longitudinal direction of the driving plate;

a release driving portion formed to be inclined with respect to the release portion; and a catching portion provided at a distal end of the release driving portion and extending by a predetermined length in an extending direction of the release portion.

22. The port replicator according to claim 17, wherein the at least one cam slot comprises:

a release portion formed linearly in a longitudinal direction of the driving plate;

a release driving portion formed to be inclined with respect to the release portion; and a catching portion provided at a distal end of the release driving portion and extending by a predetermined length in an extending direction of the release portion.

* * * * *